United States Patent
Juul et al.

(10) Patent No.: US 6,505,701 B2
(45) Date of Patent: Jan. 14, 2003

(54) STEERING SYSTEM FOR A VEHICLE

(75) Inventors: Torben Juul, Sønderborg (DK); Tom Rudolph, Ames, IA (US); Jørgen Clausen, Sønderborg (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 10/033,287

(22) Filed: Dec. 26, 2001

(65) Prior Publication Data
US 2002/0092697 A1 Jul. 18, 2002

(30) Foreign Application Priority Data
Dec. 28, 2000 (DE) .......................... 100 65 551

(51) Int. Cl.[7] .............................. B62D 5/09
(52) U.S. Cl. .................. 180/418; 180/419; 180/421; 180/442
(58) Field of Search .............. 180/418, 419, 180/420, 421, 442

(56) References Cited
U.S. PATENT DOCUMENTS

| | | | | |
|---|---|---|---|---|
| 4,002,220 A | * | 1/1977 | Wible | 180/141 |
| 4,144,946 A | * | 3/1979 | Melocik | 180/132 |
| 4,565,257 A | * | 1/1986 | Hanson | 180/135 |
| 4,771,851 A | * | 9/1988 | Nystuen et al. | 180/135 |
| 4,802,545 A | | 2/1989 | Nystuen et al. | |
| 5,234,069 A | * | 8/1993 | Krone et al. | 180/135 |
| 5,489,005 A | * | 2/1996 | Marcott et al. | 180/134 |
| 5,520,262 A | * | 5/1996 | Marcott | 180/418 |
| 5,899,292 A | * | 5/1999 | Paul et al. | 180/419 |
| 6,035,909 A | * | 3/2000 | Holmes | 144/4.1 |

FOREIGN PATENT DOCUMENTS

DE    3543054    6/1986

* cited by examiner

Primary Examiner—Daniel G. DePumpo
Assistant Examiner—Tony Winner

(57) ABSTRACT

A steering system (1) for a vehicle with a first steering arrangement (6), with a first sensor (7), with a second steering arrangement (8), which includes an articulated steering, which has a second sensor (9), and with a steering unit (5). To improve the steering comfort, the steering unit (5) is fixedly connected with the first steering arrangement (6) and the second steering arrangement (8) is connected with a follow-up arrangement, which comprises the first sensor (7), a control device (10) and a valve arrangement (11).

7 Claims, 1 Drawing Sheet

STEERING SYSTEM FOR A VEHICLE

FIELD OF INVENTION

The invention concerns a steering system for a vehicle with a first steering arrangement, particularly a wheel steering, which has a first sensor, with a second steering arrangement, particularly an articulated steering, which has a second sensor, and with a steering unit.

BACKGROUND OF THE INVENTION

A conventional steering system is shown in U.S. Pat. No. 4,565,257. The vehicle shown there can both be steered in that the wheels are turned in relation to a first vehicle part and in that the first vehicle part is turned in relation to a second vehicle part, namely around a converting kit that is arranged approximately in the middle of the vehicle. The driver can select, which of the two steering forms he uses. When the wheels are turned in the same direction, in which also the vehicle is articulated, very narrow curve radii can be driven. When the wheels are turned in the opposite direction as the articulation of the vehicle, the vehicle can be driven in parallel to a predetermined line with the shovel in a slanting position.

A similar vehicle is shown in U.S. Pat. No. 4,802,545. There the wheels, which are arranged on a rotary stool, can be steered in relation to a vehicle part, while this vehicle part can be articulated, that is, turned, in relation to another vehicle part. The change-over between the two steering forms is made via a hydraulically operated selection valve.

DE 35 43 054 Al shows a hydraulic steering for vehicles with an articulated frame, on which also wheels are steered. The steering takes place in accordance with a predetermined schedule, which foresees that during steering, first the wheel steering is activated until the end stop, and only then the working cylinder for the articulated frame is activated, whereas for the return steering the working cylinder of the articulated frame is disconnected first, after which the wheels are straightened.

Changing over between the two steering forms that must be made by the driver in the two references mentioned first, means an additional operation, which must be performed by the driver. In the reference mentioned last, the individual steering movements can only be made one after the other.

Therefore, a principal object of this invention is to increase steering comfort of the vehicle for the operator.

SUMMARY OF THE INVENTION

The steering system of this invention has a steering unit that is fixedly connected to a first steering arrangement, and a second steering arrangement is connected to a follow-up arrangement, which comprises a first sensor, a control device and a valve arrangement.

Immediately, the driver basically activates only the first steering arrangement. The second steering arrangement follows the first steering arrangement in accordance with the "master/slave" principle. By means of the first sensor, the position of the first steering arrangement is monitored practically continuously, and passed on to the control device. The control device then controls a valve arrangement, which supplies the second steering arrangement with hydraulic fluid with the corresponding pressure and the corresponding direction. Thus, the two steering arrangements work together or simultaneously, so that the advantages of both steering arrangements can be utilised, without requiring any additional operations.

The follow-up arrangement comprises the second sensor. Then, the second steering arrangement is fixed in a control circuit, whose desired value is predetermined by the first steering arrangement. This improves the quality, with which the second steering arrangement can follow the first steering arrangement.

The valve arrangement is made as a proportional valve. Thus, it is particularly simple to have the second steering arrangement perform a proportional following of the movement of the first steering arrangement. Accordingly, the second steering arrangement will reach its end position, when the first steering arrangement is also in this position.

A supply device is common for both steering arrangements. The supply device has a priority device, which gives the second steering arrangement a higher priority than the first steering arrangement. This embodiment is particularly advantageous, when the second steering arrangement has a larger cylinder displacement than the first one. In this case, it must always be possible to supply sufficient hydraulic fluid to the articulated steering to enable it to follow the wheel steering.

DESCRIPTION OF THE PREFERRED EMBODIMENT

Figure 1:
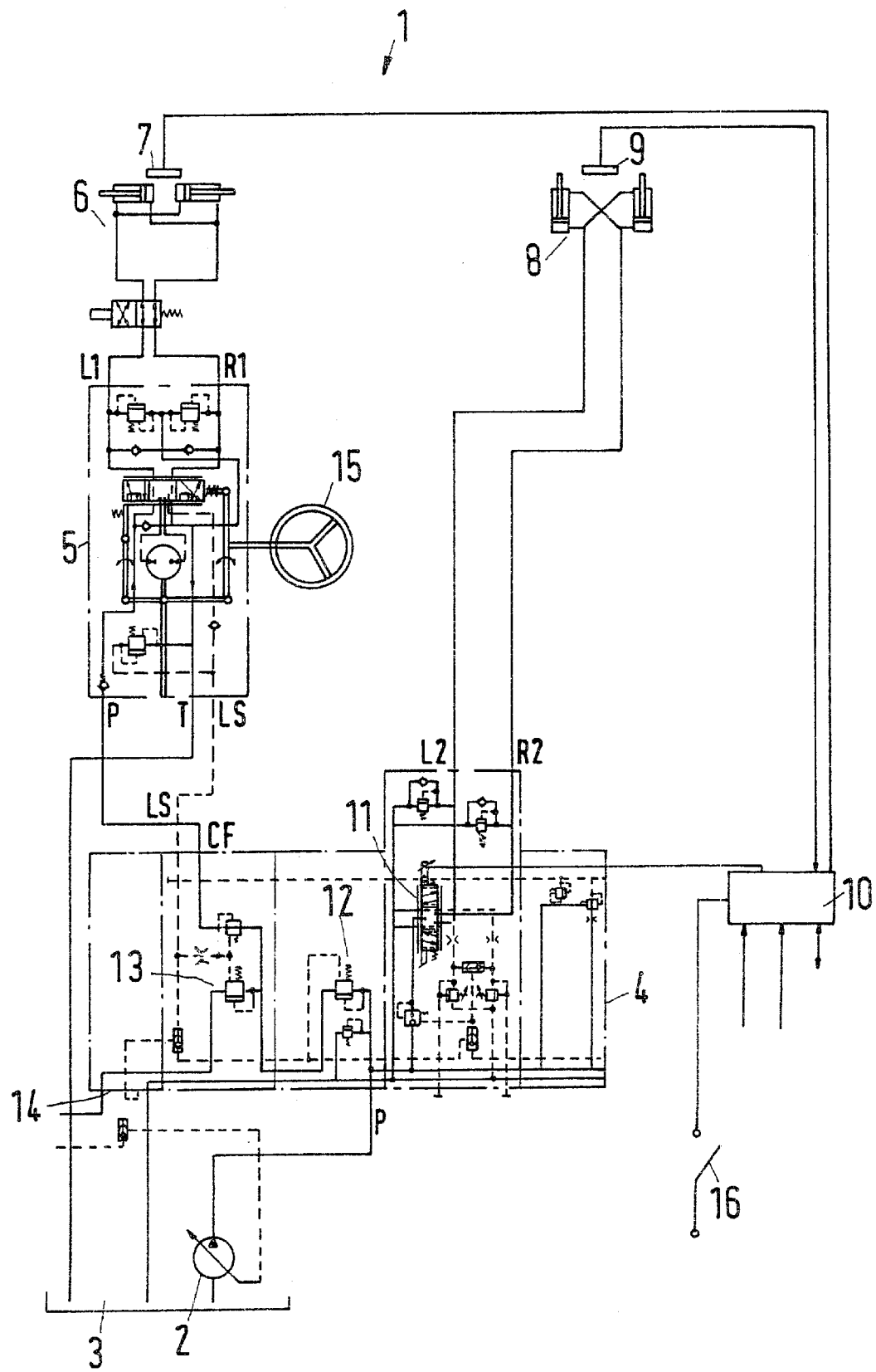
FIG. 1 is a schematic view of a hydraulic steering system of this invention.

A hydraulic steering system 1 has a pump 2, which pulls the hydraulic fluid from a tank 3 and supplies it to an inlet P of a valve block 4.

Via a control unit 5, for example a control unit of the type OSPC 80 LS from Danfoss A/S, Denmark, the valve block 4 is connected with a first steering motor arrangement 6, whose position is monitored by a first sensor 7. The first steering motor arrangement acts upon wheels, not shown in detail, of a vehicle, that is, the first steering motor arrangement 6 is a substantial part of a wheel steering.

The valve block 4 is also connected with a second steering motor arrangement 8, whose position is monitored by a second sensor 9. The second steering motor arrangement 8 is part of an articulated steering, that is, the steering cylinders of the second steering motor arrangement 8 can turn two vehicle parts in relation to each other, which are connected with each other by means of a connecting kit. When both vehicle parts are provided with wheels, the turning of the two vehicle parts also means that the vehicle changes its direction. Wheel steerings and articulated steerings are known per se. Shown is that each steering motor arrangement 6, 8 is equipped with two piston-cylinder units. However, the number of piston-cylinder units per steering motor arrangement 6, 8 is of inferior importance in the present case. However, it can be observed that the second steering motor arrangement 8 has a larger oil consumption for the articulated steering than the first steering motor arrangement 6 for the wheel steering.

The two sensors 7, 9 are connected with a control device 10, which activates a proportional valve 11, which again controls the connection from the pressure inlet P to the second steering motor arrangement 8. The proportional valve 11 can be of the type PVG from Danfoss A/S. Depending on the direction, in which it is operated, the pump inlet P of the valve block 4 is connected either with a directional line L2 of the second steering motor arrangement 8 or with another directional line R2 of the second steering motor arrangement 8.

Between the pressure connection P of the valve block and an outlet CF, which is connected with the control device, a priority valve 12 is arranged, which is coupled so that the proportional valve 11 for the second steering motor arrangement 8 is preferably supplied with hydraulic fluid. Between the priority valve 12 and the outlet CF of the valve block 4 an additional priority valve 13 can be arranged, which supplies an outlet 14 of the valve block 4 with hydraulic fluid, the outlet 14 having a lower priority than the outlet CF.

A driver steers the vehicle by means of the steering unit 5, for example via a schematically shown steering hand wheel 15 or a joystick (not shown in detail), which causes the required changes in the steering unit 5, either electrically or hydraulically, to supply the first steering motor arrangement with pressurised hydraulic fluid in the correct direction. This activation of the steering unit 5 causes that the steered wheels are turned in relation to the vehicle. This movement is detected by means of the first sensor 7 and reported to the control device 10. The control device 10 activates the proportional valve 11, which then supplies the second steering motor arrangement 8 with hydraulic fluid in such a way that the second steering motor arrangement causes an articulated steering of the vehicle to the same extent as the wheel steering caused by the first steering motor arrangement 6. The articulated steering, that is, the movement of the second steering motor arrangement 8, is detected by the second sensor 9 and reported to the control device 10, so that the second steering motor arrangement 8 can be made to follow the first steering motor arrangement 6 in a closed control circuit. Additionally, the proportional valve 11 facilitates this following in that it supplies a hydraulic fluid amount, which is proportional to a prespecified value. Thus, it can be achieved in a simple manner that the second steering motor arrangement 8 follows the first steering motor arrangement 6 proportionally. In other words, the second steering motor arrangement 8 reaches its end position, when also the first steering motor arrangement 6 has reached this end position.

When such a method has been chosen, and it is known that the cylinder displacements in the two steering motor arrangements 6, 8 are very different, it is very important that sufficient hydraulic fluid is always available for the articulated steering, in order that it can follow the steered wheels of the wheel steering. This is ensured by means of the priority valve 12. This gives the articulated steering the first priority and the wheel steering the second priority. In the extreme case, this may cause that only a small amount of oil is available for the first steering motor arrangement 6, which would theoretically cause that at this instant the vehicle is only steerable to a very limited extent. However, the limited amount of oil causes that the first steering motor arrangement 6 can only perform a very small steering deflection. Accordingly, immediately after, the oil requirement of the second steering motor arrangement is also very small, so that in a very short time the priority valve 12 ensures a state of balance, in which both steering motor arrangements 6, 8 are supplied with the required amount of oil. Only when both steering motor arrangements 6, 8 require no oil, the second priority valve 13 releases oil (or another hydraulic fluid) for an additional working hydraulic.

The control device 10 can be connected with a switch 16, with which the second steering motor arrangement 8 can be completely deactivated. However, this deactivation is only permissible, when the vehicle is in a straight position. Such a deactivation can be advantageous, when the vehicle, usually a building site vehicle or a self-propelling working machine, is set up for driving in the street, where only a wheel steering is desired.

When the commands for the steering unit 5, for example from a joystick, are also processed via the control device 10, the priority valve 12 can, under certain circumstances, be dispensed, as the priority control can be performed electrically. This control then processes the available information in such a way that the second steering motor arrangement 8, that is, the articulated steering, can always follow the first steering motor arrangement, that is, the wheel steering 6.

It is therefore seen that this invention will accomplish at least all of its stated objectives.

We claim:

1. A steering system for a vehicle with a first wheel steering arrangement, with has a first sensor, with a second articulated steering arrangement, which has a second sensor, and with a steering unit, characterized in that the steering unit (5) is fixedly connected with the first steering arrangement (6) and the second steering arrangement (8) is connected with a follow-up arrangement, which comprises the first sensor (7), a control device (10) and a valve arrangement (11) wherein a supply device (P) is common for both steering arrangements (6, 8), said supply device having a priority device (12), which gives the second steering arrangement (8) a higher priority than the first steering arrangement (6).

2. A steering unit according to claim 1, characterised in that the follow-up arrangement also comprises the second sensor (9).

3. A steering unit according to claim 1, characterised in that the valve arrangement (11) is a proportional valve.

4. A steering system according to claim 1, characterized in that the priority device (12) is in the form of a priority valve.

5. A steering system according to claim 1, characterized in that the priority device (12) comprises the control device (10).

6. A steering system according to claim 1, characterized in that the system has an additional priority means (13) for a working hydraulic (14), which has a lower priority than the supply of the first steering arrangement (6).

7. A steering system for a vehicle with a first wheel steering arrangement, which has a first sensor, with a second articulated steering arrangement, which has second sensor, and with a steering unit, characterized in that the steering unit (5) is fixedly connected with the first steering arrangement (6) and the second steering arrangement (8) is connected with a follow-up arrangement, which comprises the first sensor (7), a control device (10) and a valve arrangement (11), wherein the valve arrangement (11) is a proportional valve, wherein the first sensor (7) is operatively associated with the control device (10) and first wheel steering arrangement for detecting movement from the first wheel steering arrangement and reporting the movement to the control device (10), wherein the control device (10) is operatively associated with the proportional valve for activating the proportional valve, and wherein the proportional valve is operatively associated with the second articulated steering arrangement for moving the second articulated steering arrangement proportional to the detected movement of the first wheel steering arrangement.

* * * * *